(12) United States Patent
Chimner et al.

(10) Patent No.: US 9,598,067 B2
(45) Date of Patent: Mar. 21, 2017

(54) CONTROL STRATEGY FOR AWD CONNECTION AND DISCONNECTION

(71) Applicant: Eaton Corporation, Cleveland, OH (US)

(72) Inventors: Christian Thomas Chimner, Royal Oak, MI (US); John Allen Grogg, LaOtta, IN (US)

(73) Assignee: Eaton Corporation, Cleveland, OH (US)

(*) Notice: Subject to any disclaimer, the term of this patent is extended or adjusted under 35 U.S.C. 154(b) by 42 days.

(21) Appl. No.: 14/408,285

(22) PCT Filed: Mar. 12, 2013

(86) PCT No.: PCT/US2013/030483
§ 371 (c)(1),
(2) Date: Dec. 15, 2014

(87) PCT Pub. No.: WO2014/031158
PCT Pub. Date: Feb. 27, 2014

(65) Prior Publication Data
US 2015/0175148 A1 Jun. 25, 2015

Related U.S. Application Data

(60) Provisional application No. 61/692,781, filed on Aug. 24, 2012.

(51) Int. Cl.
B60W 10/02 (2006.01)
B60W 10/119 (2012.01)
(Continued)

(52) U.S. Cl.
CPC .......... B60W 10/119 (2013.01); B60W 10/02 (2013.01); B60W 10/06 (2013.01); B60W 10/16 (2013.01); B60W 30/182 (2013.01); B60W 50/082 (2013.01); B60K 23/0808 (2013.01); B60W 30/192 (2013.01); B60W 2520/263 (2013.01); B60W 2710/021 (2013.01); B60W 2710/0666 (2013.01);
(Continued)

(58) Field of Classification Search
CPC ............ B60W 10/119; B60W 30/182; B60W 50/082; B60W 2720/403
See application file for complete search history.

(56) References Cited

U.S. PATENT DOCUMENTS 5,105,901 A * 4/1992 Watanabe .......... B60K 23/0808
180/245
5,582,263 A 12/1996 Varma et al.
(Continued)

FOREIGN PATENT DOCUMENTS

EP 1826089 A2 8/2007
GB 2407804 A 5/2005
WO 2012110659 A1 8/2012

Primary Examiner — Jacob S Scott
Assistant Examiner — Tinh Dang
(74) Attorney, Agent, or Firm — Mei & Mark LLP

(57) ABSTRACT

The invention relates to switching between 2WD and 4WD of a vehicle. It is suggested to increase output power of an engine (106) when changing to 4WD. An AWD coupling (120) is opened, if not already open. To provide 4WD, a PTU clutch (108) is engaged once engine power has increased. The other couplers are sequentially engaged.

19 Claims, 4 Drawing Sheets

(51) Int. Cl.
  *B60W 10/16*  (2012.01)
  *B60K 23/08*  (2006.01)
  *B60W 50/08*  (2012.01)
  *B60W 10/06*  (2006.01)
  *B60W 30/182* (2012.01)
  *B60W 30/192* (2012.01)

(52) U.S. Cl.
  CPC . *B60W 2710/0677* (2013.01); *B60W 2710/12* (2013.01); *B60W 2720/403* (2013.01); *B60W 2720/406* (2013.01)

(56) References Cited

U.S. PATENT DOCUMENTS

| | | |
|---|---|---|
| 5,989,146 A | 11/1999 | Brown et al. |
| 6,056,666 A | 5/2000 | Williams |
| 6,142,905 A | 11/2000 | Brown et al. |
| 6,347,680 B1 | 2/2002 | Mianzo et al. |
| 6,554,091 B2 | 4/2003 | Mianzo et al. |
| 6,602,159 B1 | 8/2003 | Williams |
| 6,814,682 B2 | 11/2004 | Spitale |
| 7,337,053 B2 | 2/2008 | Piyabongkarn et al. |
| 7,510,041 B2 | 3/2009 | Bowen |
| 7,533,754 B2 * | 5/2009 | Burrows ............... B60K 6/48 180/242 |
| 2001/0036882 A1 | 11/2001 | Hrazdera |
| 2004/0198544 A1 | 10/2004 | Haka |
| 2005/0187061 A1 | 8/2005 | Haka |
| 2005/0261101 A1 | 11/2005 | Yoshioka |
| 2007/0193793 A1 | 8/2007 | Burrows et al. |
| 2009/0076696 A1 | 3/2009 | Perkins |
| 2010/0094519 A1 | 4/2010 | Quehenberger et al. |
| 2011/0257858 A1 * | 10/2011 | Kobayashi ............ B60K 23/08 701/69 |

\* cited by examiner

CONTROL STRATEGY FOR AWD CONNECTION AND DISCONNECTION

PRIORITY

This application claims the benefit of priority of, and is a §371 National Stage entry of, PCT/US2013/030483 filed Mar. 12, 2013, and further claims the benefit of priority of U.S. provisional patent application 61/692,781 filed Aug. 24, 2012, incorporated herein by reference in their entireties.

FIELD

This application relates to control of All-Wheel Drive (AWD) driveline couplings including control of power transfer during conversion between Two-Wheel Drive (2WD) and AWD.

BACKGROUND

Motor vehicles may include a primary drive axle powered by an engine and transmission. The primary drive axle pushes or pulls the remaining auxiliary axle of the vehicle depending upon whether it is in a Front-Wheel Drive (FWD) or Auxiliary-Wheel Drive (RWD) configuration. Some vehicles can convert to All-Wheel Drive (AWD) by selectively engaging the auxiliary axle and actively powering both the primary and auxiliary axles.

Prior systems can suffer from deceleration during the conversion to the extent that the driver notices a change in vehicle travelling speed when AWD is engaged. In some circumstances, the change results in unsafe or suboptimal conversion conditions.

SUMMARY

The methods disclosed herein overcome the above disadvantages and improve the art by way of a computer program product comprising a tangible memory device and a program stored on the tangible memory device, the program being readable and executable by a processor. The program comprises instructions for making connections in a vehicle driveline comprising the steps of receiving, at a processor, a request to convert a vehicle from a single drive axle-powered driveline to a two drive axle-powered driveline. The processor may receive sensor data and may process the received sensor data to determine vehicle dynamics including current engine power output. The instructions may determine an additional amount of engine power required to convert the vehicle from the single drive axle-powered driveline to the two drive axle-powered driveline. The processor may send a command to open at least one coupler and a command to increase engine power by the determined additional amount.

A vehicle driveline may comprise a plurality of sensors and a plurality of actuators with respective connections to an electronic control computer, a primary drive axle, an engine, a power transfer unit, and an auxiliary drive axle. The auxiliary drive axle may comprise a drive shaft, an all-wheel drive coupling, an auxiliary drive unit, a first auxiliary drive axle on a first side of the auxiliary drive unit, and a second auxiliary drive axle on a second side of the auxiliary drive unit. The electronic control computer may comprise a processor and a tangible memory device. The tangible memory device may comprise a stored program, the program being readable and executable by the processor. The program may comprise instructions for making connections in a vehicle driveline.

The processor may receive a request to convert from a single drive axle-powered driveline to a two drive axle-powered driveline. The processor may receive sensor data. The processor may process the received sensor data to determine vehicle dynamics including current engine power output. The processor may determine an additional amount of engine power required to convert the vehicle from the single drive axle-powered driveline to the two drive axle-powered driveline. The processor may send a command to open at least one coupling in at least one of the power transfer unit, the all-wheel drive coupling, or the auxiliary drive unit. The processor may send a command to increase engine power by the determined additional amount. The at least one coupling may receive the command to open the coupling. The engine may receive the command to increase engine power. At least one of the plurality of actuators opens the at least one coupling and at least another of the plurality of actuators increases the engine power by the determined additional amount.

The program for the vehicle driveline may comprise instructions for making disconnections in the vehicle driveline comprising the following steps. The processor may receive a request to convert from a two drive axle-powered driveline to a single drive axle-powered driveline. The processor may receive sensor data and may process the received sensor data to determine vehicle dynamics including current engine power. The processor may use the programming to determine whether to suspend or decrease engine power output during a conversion of the vehicle from the two drive axle-powered driveline to the single drive axle-powered driveline. The processor may send a command to open at least one coupling in at least one of the power transfer unit, the all-wheel drive coupling, or the auxiliary drive unit. The processor may send a command to decrease or suspend engine power. The at least one coupling may receive the command to open the coupling. The engine may receive the command to decrease or suspend engine power. At least one of the plurality of actuators opens the at least one coupling and at least another of the plurality of actuators decreases or suspends the engine power output during the conversion.

It is to be understood that both the foregoing general description and the following detailed description are exemplary and explanatory only.

DETAILED DESCRIPTION

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures and are not meant to be limiting.

While the disclosure references, in large part, a Front-Wheel Drive (FWD) vehicle and operational mode, the concepts are equally applicable to a Rear-Wheel Drive (RWD) vehicle and operational mode. Because of this, references to "front" and "rear" are, at times, for convenience and consistency and are not meant to exclude the applicability of the disclosure to RWD vehicles. Therefore, a primary drive axle may be the axle of a FWD or RWD operating vehicle that receives power directly from the engine. An auxiliary drive axle may be the pushed or pulled axle of a vehicle operating in FWD or RWD mode. The auxiliary drive axle becomes a powered axle when AWD is activated and engine power is actively supplied to the auxiliary drive axle.

Figure 1:
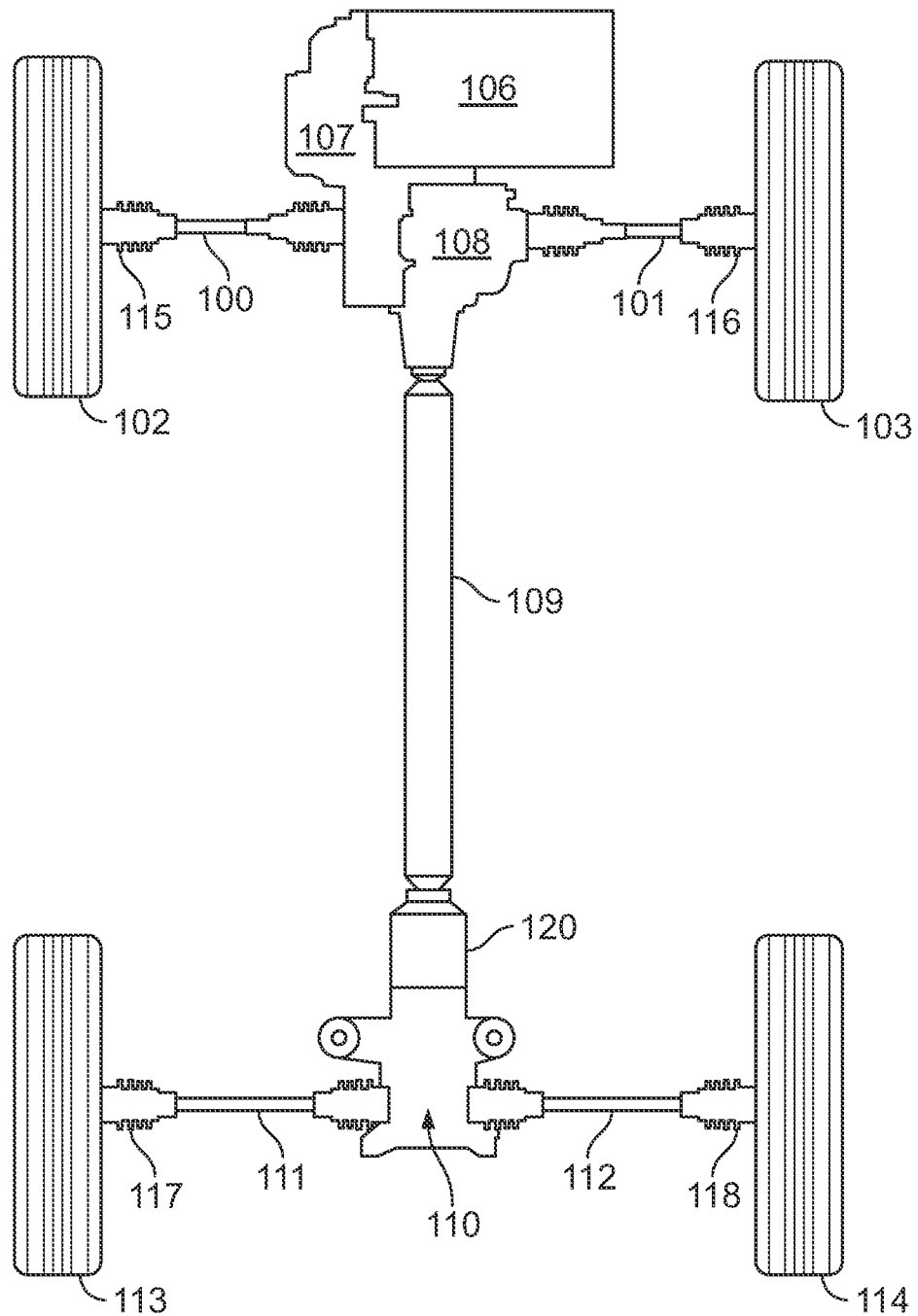
FIG. 1 is a schematic example of a simplified vehicle driveline.

FIG. 1 is a simplified schematic example of a vehicle driveline. A primary drive axle may be a single shaft spanning between wheels, or, as shown, may include left and right half shafts 100, 101 and left and right wheels 102, 103. Optional elements include left and right wheel hub disconnects 115, 116 and a differential system, which may be centralized or left and right front differentials. A motor 106 generates motive power which is transferred to a transmission 107 for use in the vehicle as torque. Each component may further include a sensor and electronic and or hydraulic actuator.

An auxiliary drive axle comprises a drive shaft 109, an all-wheel drive coupling 120, an auxiliary drive unit, a first auxiliary drive axle 111 on a first side of the auxiliary drive unit, and a second auxiliary drive axle 112 on a second side of the auxiliary drive unit. In the illustrated example, the vehicle is FWD, and so the auxiliary drive unit is shown as rear drive unit 110.

The power transfer unit 108 may be a pass-through for the torque, allowing the torque to remain in the primary drive axle 100, 101 during an unengaged condition, but transferring the torque during an engaged condition. An engagement feature, such as a synchronizer or clutch pack, in power transfer unit 108 enables a selectable amount of torque to transfer from primary drive axle to drive shaft 109. Drive shaft 109 can be coupled to, for example, a pinion while the engagement feature couples to a hypoid gear. Drive shaft 109 selectively couples torque to an optional ECC (electronically controlled coupler), or, as illustrated, to an all-wheel drive coupling 120. The torque may then pass to rear drive unit 110, which may house an optional rear differential attached to left and right auxiliary half shafts 111, 112. Torque can be selectively coupled to left and right rear wheels 113, 114.

Torque is controllable in the driveline for such purposes as slip, anti-slip, cornering, braking and other driving purposes.

The differentials are optional, but otherwise function to selectively couple an amount of torque to left and right front and rear wheels 102, 103, 112, and 113. That is, the differentials comprise coupling members that selectively output all or some of the torque input to the differential. The differentials may comprise, for example, a dog clutch or synchronizer for the selective torque transfer. The differentials may comprise torque vectoring mechanisms, or may be of the "open differential" type.

In lieu of a rear differential, the rear drive unit 110 may house non-differentiating coupling members to transfer torque to the half-shafts.

Another optional implementation may include left and right auxiliary wheel hubs 117, 118 to selectively couple torque to left and right rear wheels 113, 114 via hydraulics and clutch members. The wheel hubs may also be used for such purposes as idling the rotation of the rear half shafts. In some implementations, the auxiliary left and right wheel hubs 117, 118 may be linked to the brake system in an actuatable manner.

The vehicle of FIG. 1 can operate, in a default state, in FWD mode. All engine power can remain in the primary drive axle so that active torque transfer occurs to left and right front wheels 102, 103. Front differential and primary left and right wheel hubs 115 and 116 can electronically couple to sensors and a CAN of an electronic control system 320 and they can receive commands to open and close their couplings to control vehicle dynamics such as slip, lateral acceleration, longitudinal acceleration, trajectory, yaw, etc. Such coupling control can assist with maintaining safe and low-wear vehicle operation.

In the default FWD mode, the engagement feature in the PTU is open and no torque is transferred to the hypoid gear or pinion. Thus, the drive shaft 109 and the remainder of the auxiliary driveline 2000 do not receive torque. This enables the auxiliary driveline 2000 to idle as a passive system. In essence, the primary driveline 1000 pulls the auxiliary driveline 2000 until the auxiliary driveline 2000 is actively powered. If the vehicle were RWD, the primary driveline 1000 would essentially push the auxiliary driveline 2000 until the auxiliary driveline 2000 was to be activated. The idled auxiliary system increases the fuel economy of the vehicle because drag and viscous losses are removed via the decoupling of PTU 108, drive shaft 109, rear drive unit 110 with optional differential, and rear half shafts (left and right auxiliary drive axles 111, 112). Yet, with the auxiliary driveline disconnected from a supply of engine power and torque, all four wheels can rotate without spinning the driveshaft or rear differential.

Figure 2:
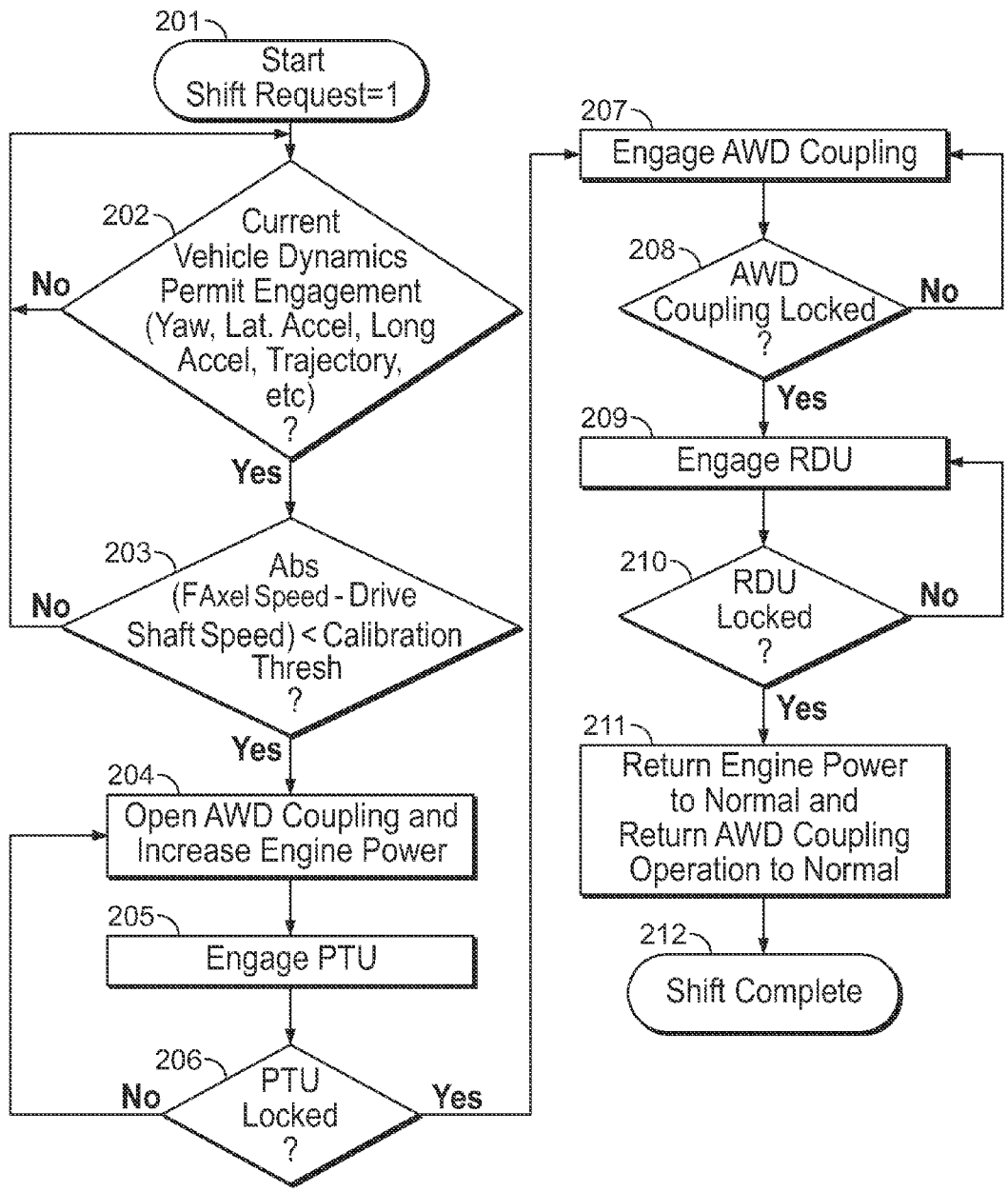
FIG. 2 is an exemplary flow chart of an AWD engagement process.

Turning to FIG. 2, the vehicle can convert from FWD to AWD beginning with a shift request input to the Electronic Control Unit 320 at the start 201. The shift request can be made through driver request via an actuator such as a toggle, pedal or switch. Or, the vehicle can sense a condition such as wheel slip, a discrepancy between actual and driver-requested trajectory, an unsafe operating condition, etc. and the vehicle can initiate the shift request.

Next, the current vehicle dynamics are reviewed at step 202 to determine if the vehicle is within a safe range to permit engagement of AWD. Sensors 301 collect data for processing in the ECU 320. Along with programming stored in the ECU 320, the data is operated on by a processor in the ECU 320 to determine vehicle conditions relating to one or more of yaw, lateral acceleration, longitudinal acceleration, trajectory, slip, etc., which must be within a particular operating range to proceed. If conditions do not permit the shift, the ECU 320 can loop through the check step 202 until conditions permit proceeding to the calibration threshold check in step 203. In this step, the ECU 320 determines the absolute value of the front axle speed minus the drive shaft speed. If the absolute value is less than a given calibration threshold, the conversion can proceed, otherwise, return to step 202.

If the all-wheel drive ("AWD") coupling 120 is not already open, AWD coupling 120 is opened in step 204. The AWD coupling 120 may be a controllable clutch that can control the amount of torque sent to the rear drive unit 110.

Engine power is also increased in step 204. Engine power increases are calculated to convert from FWD to AWD without the driver experiencing deceleration or other adverse operating conditions. Thus, the magnitude of the engine power increase is sufficient to avoid the transfer of kinetic energy to the auxiliary driveline. With sufficient engine power increase, the auxiliary driveline may be connected for AWD operational mode without a lurching sensation and without loss of forward motion.

The ECU 320 collects sensor data from sensors 301 relating to current engine power and other operational values. The ECU 320 processes the data to determine how much additional engine power is needed to engage the auxiliary driveline without parasitic use of vehicle kinetic energy. The additional engine power can also be based on maintaining safe vehicle conditions. To these ends, the engine power increase may allow the vehicle to experience immediate power supply to the auxiliary wheels 113, 114 once the conversion is complete.

After the AWD coupling is opened, the extra engine power is used to bring the components of the AWD coupling up to speed with the primary driveline. In addition to a one-time power addition, the ECU 320 can control the engine to add power stepwise in proportion to an amount needed for sequential coupling for the AWD conversion. The sequence of FIG. 4 enables the synchronized locking of the primary driveline with the auxiliary driveline in a manner that is not detectable by the driver. That is, the sequence minimizes the use of vehicle kinetic energy to bring the auxiliary driveline up to speed. The active addition of engine power prevents the deceleration of the vehicle as the auxiliary components come up to speed. The sequential nature can circumvent harsh locking conditions which can cause excessive component wear. And, lastly, the one-time or stepwise additional engine power and sequential coupling can enhance the vehicle stability during engagement and extend the range of operating conditions available for engaging the AWD mode. That is, the vehicle can more safely engage without affecting vehicle handling and can engage AWD without pulling kinetic energy out of the other moving parts of the overall driveline. By checking the vehicle dynamics prior to engagement, the system can also ensure that AWD is engaged at a time when it will not negatively affect vehicle handling or stability.

At times it may be desirable to use other energy sources in harmony with the increased engine power. At these times, the programming may rely on vehicle kinetic energy to assist with the conversion to AWD. The additional engine power may be calculated to work in synergy with a selected amount of vehicle kinetic energy. Another option is to include a separate torque source in the auxiliary drive axle, such as one or more motors that can bring the drive shaft 109 or auxiliary half shafts 111 and 112 within a rotational range for coupling with the primary driveline. The increased engine power may be calculated to augment the torque from the separate source.

In step 205, the engagement feature of the PTU 108 is engaged so that torque transfers from the primary driveline to the hypoid gear and pinion. The system can first check the rotational speed difference between the driveshaft 109 and the engagement feature to avoid exceeding the power capacity of the engagement feature.

This same rotational speed difference check may be completed if dog clutches are used in the rear drive unit. In the instance that dog clutches are used for either the engagement feature or in the rear drive unit, too large of a speed difference may cause the dog clutches to ratchet, which can damage not only the clutch, but affiliated synchronizing mechanisms. To remedy the possibility of such damage, the system and method may include an optional additional torque source, as above. Or, the system may first bring the rear differential up to speed by coupling the rear half-shafts to the differential in the rear drive unit 110 and then closing the AWD coupling 120. If the driveshaft 109 rotates within a range of the primary drive axle, the engagement feature may close to join the primary and auxiliary drivelines.

Returning to the program outlined in FIG. 2, the torque transfer through the PTU 108 brings the driveshaft 109 up to the same rotational speed as the primary driveline. A check of the PTU in step 206 determines if the PTU engagement feature is fully locked. If not, the engagement feature is re-opened and the PTU is re-engaged. If the PTU is locked in step 206, the process continues the gradual locking of the AWD auxiliary driveline.

If the PTU is locked, in step 207, the AWD coupling 120 is engaged. In step 208, the system checks to ensure that the AWD coupling 120 is locked. If not, the process loops back to step 207 to engage the AWD coupling 120. The AWD coupling 120 may gradually increase locking torque from 0-100% to help improve shifting smoothness.

If the AWD coupling is engaged, the rear drive unit (RDU) 110 engages with the AWD coupling 120. The drive shaft 109 may then bring the rear differential up to speed via the AWD coupling 120. Then, the differential may lock to the auxiliary half shafts. If the RDU 110 does not lock, as checked in step 210, the RDU 110 is re-engaged. If the RDU 110 locks, the driveshaft, rear differential and rear half shafts 111, 112 will all spin at substantially the same speed. In step 211, the engine power is returned to normal such that the extra engine power is discontinued in step 211. In addition, in step 211, the AWD coupling operation is returned to normal.

With the shift from FWD to AWD complete in step 212, normal operation of the AWD coupling may entail electronic or hydraulic regulation to control the torque transferred across an internal clutch. The electronic control unit 320 may comprise a vehicle dynamics controller that determines how much torque should be split between the front and rear drive axles. Control lines and actuators may implement the torque control.

Normal operation of the engine after shift complete 212 may entail adjustments to engine power based on commands from the vehicle dynamics controller, which may be based on driving conditions such as acceleration, braking, slip, traction control, etc.

With the vehicle shifted to AWD mode, all four wheels can be actively engaged by the ECU 320 or other vehicle dynamics controller for a variety of purposes such as stability control, traction control, anti-slip, etc.

Figure 4:
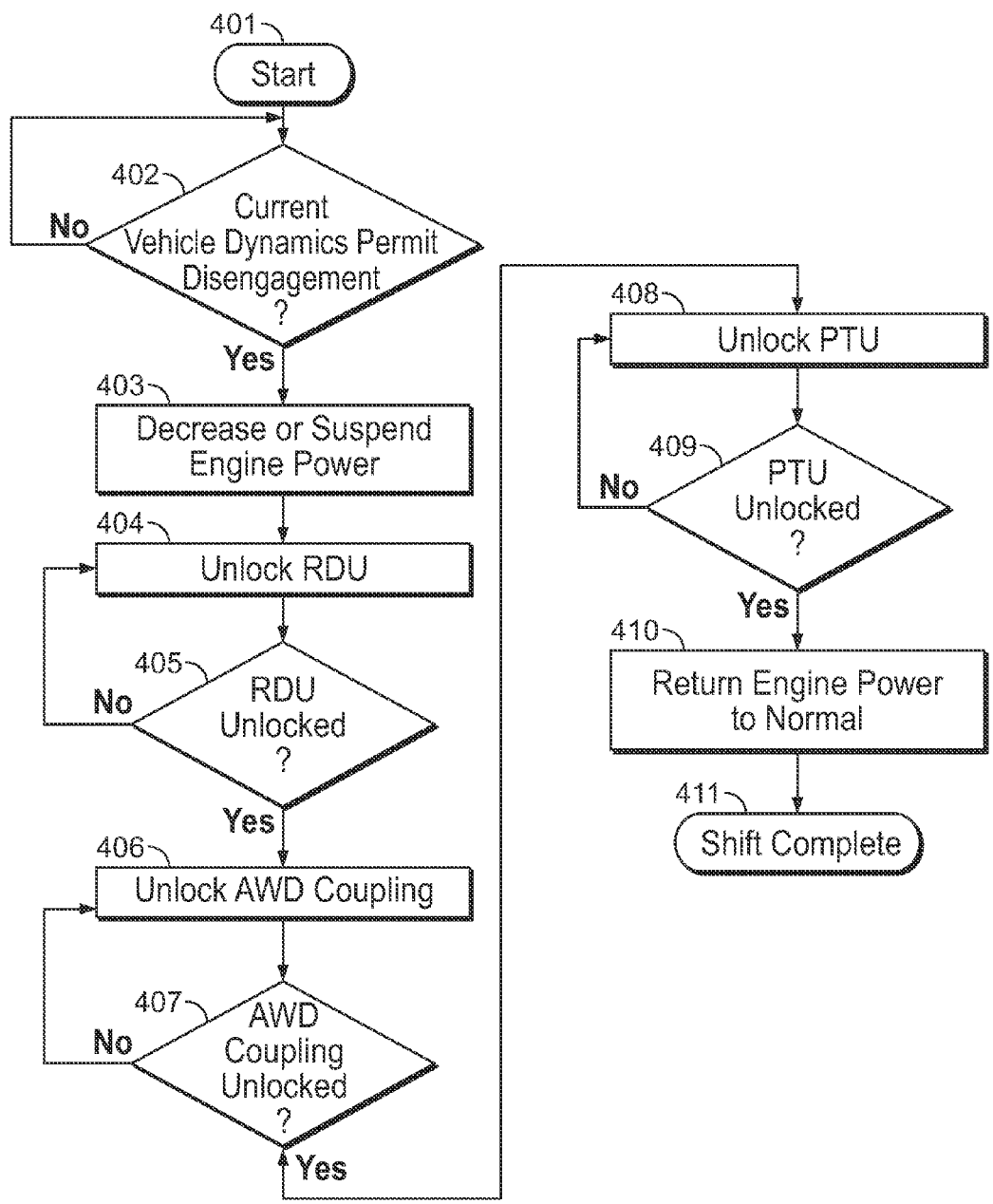
FIG. 4 is an exemplary flow chart of an AWD disengagement process.

The process of FIG. 2 can be reversed sequentially to shift back to FWD from AWD, or, the couplings may be opened simultaneously, the shift mode depending on current engine power. As shown in FIG. 4, a manual or ECU 320 initiated shift request is received at step 401. The processor executes programming to check if current vehicle dynamics permit disengagement of the AWD driveline in step 402. If conditions do not permit disengagement, the system can loop back to restart the check.

If the vehicle dynamics permit disengagement, then in step 403, the system analyzes the engine power demand. If the driver command is low, or the torque output is within a predetermined range, the system may suspend engine power briefly and simultaneously perform step 404 to unlock the RDU, step 406 to unlock the AWD coupling, and step 408 to unlock the PTU. The brief period may be on the order to 100-200 ms. The system may then check that all scheduled unlocks of the RDU, AWD coupling, and PTU are complete (steps 405, 407, and 409).

If, however, the engine power demand is high, disengagement may be harsh to the clutches or synchronizers. In that high rotation situation, sequential unlocking and unlock checking is performed with either a decrease of engine power or a suspension of engine power In order to complete the disclosed processes, the driveline comprises a variety of electronic and hydraulic components that communicate with an electronic control unit (ECU) 320. Appropriate connective members such as wires, cables, hoses, etc. are supplied along the driveline between the ECU 320 and at least one hydraulic control system and/or electronic control system having motors or solenoids. If necessary, the ECU 320 may comprise several remote computer devices in the vehicle, or the ECU 320 may alternatively comprise remote computing devices that relay communications to each other or a central ECU 320.

Figure 3:
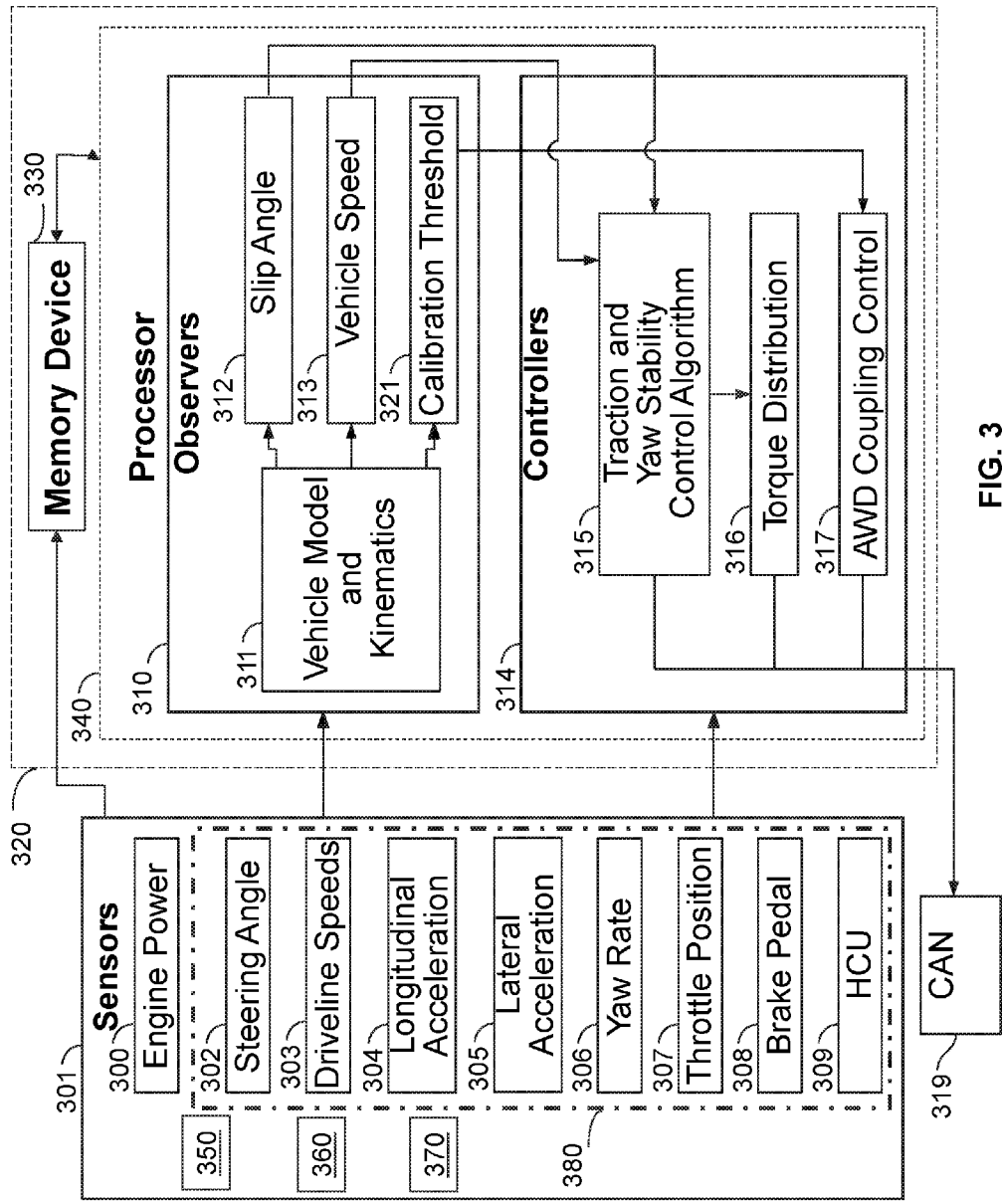
FIG. 3 is a schematic example of a control system for driveline control.

FIG. 3 shows an exemplary schematic for a vehicle control system. The vehicle control system comprises sensors 301, ECU 320, and at least one vehicle bus with associated controller area network (CAN) 319. The vehicle bus/CAN 319 may connect to at least one hydraulic controller for hydraulically controlled clutches or PTU engagement feature. Vehicle bus/CAN 319 may also connect to actuators for electrical control of devices. In lieu of having separate electrical lines for each sensor and actuator at each driveline component, the CAN may be bidirectional. That is, the CAN may send commands from the ECU 320 and return data from the sensors 301.

Sensors 301 are dispersed around the vehicle to collect data for use in observers 310 and controller 314 of ECU 320. The sensors may comprise one or more of an engine power sensor 300, auxiliary drive unit (RDU) status sensor 350, AWD coupling status sensor 360, PTU status sensor 370, and vehicle dynamics sensors 380. The vehicle dynamics sensors 380 may comprise steering angle sensor 302, driveline speed sensor 303, longitudinal acceleration sensor 304, lateral acceleration sensor 305, yaw rate sensor 306, throttle position sensor 307, brake pedal sensor 308, and hydraulic control unit sensor 309. The sensors shown in FIG. 3 are exemplary only, and additional or fewer sensors may be used. For example, sensors may be included for any motor or solenoid actuators and rotational sensors may be used to sense the rotational speed of the pinion, left and right auxiliary drive axles 111, 112, primary drive axles 100, 101, drive shaft 109, differentials, wheel hubs, etc. PTU status sensor 370, AWD coupling status sensor 360, and auxiliary drive unit (RDU) status sensor 350 may also be implemented to confirm the respective open or closed status of the PTU engagement feature, AWD coupling 120, and RDU 110. The sensor data can be supplied to the ECU 320 for observational purposes and for control purposes.

The sensors 301 forward data to the ECU 320, which may comprise at least one processor 340 with an associated memory device 330 and stored algorithms. The processor 340 may be part of a computer system or on-board chip system. The memory device 330 may be a FLASH, ROM, RAM or other tangible storage device for storing processor-readable instructions which, when executed by a processing device, cause the processing device to perform the disclosed methods. That is, ECU 320 can receive vehicle operational data from sensors 301 and can process the data to determine vehicle dynamics, engine power needs, thresholds, step timing, completion of commands, etc. ECU 320 can also issue commands to implement each step of the engagement and disengagement processes. And, ECU 320 can compare processed and received data, pull stored predetermined data from the memory device, push received data to the memory device for storage, update stored memory data and instructions, and make determinations of vehicle conditions.

The processor of the ECU 320 may comprise one or more observers 310, which may comprise a vehicle model and kinematics observer 311. The vehicle model and kinematics observer 311 processes the data from sensors 301 according to programmed algorithms and may create data related to a slip angle 312 and vehicle speed 313. Additional data can also be created by vehicle model and kinematics observer 311, such as bank angle or roll angle data. In addition, the observers 310 comprise processing capabilities to determine if the absolute value of the primary axle speed minus the drive shaft speed is less than a calibration threshold 321. This absolute value comparison, together with processing of other vehicle dynamics data, determines if the AWD auxiliary driveline can be engaged or disengaged. If so, an input is sent to the AWD coupling control 317, which in turn generates signals for control of the engine power, PTU engagement feature, AWD coupling 120, RDU 110, and left and right auxiliary drive axles 111, 112. Instead of the centralized AWD coupling control 317, the controllers 314 may comprise separate controllers for each AWD driveline coupler, such that the AWD coupling 120, RDU 110, and PTU 108 each have a dedicated controller.

As indicated in FIG. 3, the sensors 301 may supply data directly to the controllers to enable implementation feedback. The sensors may sense changes in vehicle conditions, which can be processed, observed, and used in the determination of new commands from the controllers 314.

The slip angle 312 and vehicle speed 313 data is shared with controller 314, which also collects data from sensors 301. Controller 314 may be a part of the processor of the ECU 320 having observers 310. Or, controller 314 may be an additional processor with associated memory and stored algorithms which cooperate with the processor having observers 310. A traction and yaw stability control algorithm controller 315 is used to make determinations based upon at least one of the slip angle 312 data, vehicle speed 313 data, sensors 301 data, additional sensors, and additional data. Based on the results of the determinations made by the traction and yaw stability control algorithm controller 315, commands are sent from the controller via the vehicle bus to CAN 319 for implementation by various vehicle actuators at various locations along the vehicle driveline. The location and function of the vehicle actuators are not shown, but are within the knowledge of one of ordinary skill in the art. The commands from the controller relate to various electronically controlled stability features associated with the vehicle, including but not limited to traction control, anti-lock braking, oversteering control, understeering control, limited slip differential control, and rollover control.

Results from traction and yaw stability control algorithm controller 315 are also forwarded to torque distribution controller 316. Torque distribution controller 316 determines how much torque to transfer from the primary drive system to the secondary auxiliary drive system. Commands from torque distribution controller 316 are also forwarded for control of the hydraulics control unit.

The combination of sensors 301, ECU 320, hydraulic and/or electronic control, and actuators allows cooperation, control and observation of moving parts along the driveline. The vehicle control system assists with the synchronous operation of the AWD and FWD systems. The ECU system may determine the extent and timing of mechanical engagement of the various disclosed coupling members of the driveline. The ECU system also assists with the extent and timing of disengagement of the various disclosed coupling members of the driveline for idling of the auxiliary drive system.

In addition to that shown in FIG. 3, the observers 310 and controllers 314 may rely for implementation on programming stored in the ECU 320. The observers 310 may comprise a dedicated processor and the controllers 314 may comprise a dedicated processor, or a single processor may operate programming for both observers and controllers.

Other implementations are considered within the scope of the disclosure, such as adjusting the coupling order of the AWD auxiliary driveline. For example, it may be desirable to engage the left and right auxiliary drive axles 112, 113 with the auxiliary wheel hubs 117, 118 and rear drive unit 110 before engaging the power transfer unit 108 with the drive shaft 109. It may also be desirable to engage the rear drive unit 110 with the driveshaft 109 before engaging the power transfer unit 108 so that the driveshaft 109 is not idled and is rotating before the power transfer unit 108 is engaged. Such adjustments to coupling order may prevent ratcheting of coupling members when operation speeds are high.

Other implementations will be apparent to those skilled in the art from consideration of the specification and practice of the examples disclosed herein. It is intended that the specification and examples be considered as exemplary only.

What is claimed is:

1. A computer program product comprising a tangible memory device and a program stored on the tangible memory device, the program being readable and executable by a processor, the program comprising instructions for making connections in a vehicle driveline comprising the steps of:
   receiving, at the processor, a request to convert a vehicle from a single drive axle-powered driveline to a two drive axle-powered driveline;
   iteratively receiving, at the processor, sensor data from sensors, the sensor data comprising data indicating vehicle dynamics and current engine power;
   processing the received sensor data to determine vehicle dynamics and current engine power;
   determining an additional amount of engine power required to convert the second drive axle from an idled condition to a powered condition to covert the vehicle from the single drive axle-powered driveline to the two drive axle-powered driveline;
   sending, from the processor, a command to open at least one coupler in the second drive axle;
   sending, from the processor, a command to increase engine power by the determined additional amount;
   processing sensor data to indicate that the engine power has increased by the determined additional amount;
   sending, from the processor, in response to the indication that the engine power has increased by the determined additional amount, a command to engage a power transfer unit to connect the single drive axle to the second drive axle;
   receiving, at the processor, a signal that the power transfer unit is engaged; and
   sending, from the processor, a command to close the at least one coupler.

2. The computer program product of claim 1, wherein the tangible memory device further comprises stored predetermined values and stored instructions to:
   process the received sensor data to determine at least one of yaw, lateral acceleration, longitudinal acceleration, slip, and vehicle trajectory; and
   compare the processed sensor data to the stored predetermined values to determine vehicle readiness to convert the vehicle from the single drive axle-powered driveline to the two drive axle-powered driveline,
   wherein, when the comparison indicates vehicle readiness to convert from the single drive axle-powered driveline to the two drive axle-powered driveline, the processor outputs the command to open the at least one coupler and the command to increase engine power.

3. The computer program product of claim 2, wherein the stored predetermined values comprise at least a calibration threshold, and the instructions further comprise:
   determining a rotation speed of a powered single drive axle;
   determining a rotation speed of a drive shaft;
   calculating an absolute value of the difference between the rotational speed of the powered single drive axle and the rotational speed of the drive shaft; and
   determining if the absolute value is less than the calibration threshold,
   wherein, when the determined absolute value is less than the calibration threshold, the processor outputs commands to begin the conversion.

4. The computer program product of claim 1, further comprising instructions to engage an auxiliary drive unit of the vehicle.

5. The computer program product of claim 1, further comprising instructions to terminate the increased engine power.

6. The computer program product of claim 1, further comprising instructions to process sensor data to determine if the coupler has closed, and, if the coupler has closed, to command an auxiliary drive unit of the vehicle to engage.

7. The computer program product of claim 6, further comprising instructions to process sensor data to determine if the auxiliary drive unit has engaged, and, when the auxiliary drive unit has engaged, to terminate commands to increase engine power by the additional amount.

8. The computer program product of claim 1, wherein the additional amount of engine power is of sufficient magnitude to avoid transfer of vehicle kinetic energy to an auxiliary drive axle during conversion from the single axle-powered driveline to the two drive axle-powered driveline.

9. A vehicle driveline comprising a plurality of sensors and a plurality of actuators with respective connections to:
   an electronic control computer,
   a primary drive axle connected to an engine and a power transfer unit, and
   an auxiliary drive axle connected to the power transfer unit, the auxiliary drive axle comprising a drive shaft, an all-wheel drive coupling, an auxiliary drive unit, a first auxiliary drive axle on a first side of the auxiliary drive unit, and a second auxiliary drive axle on a second side of the auxiliary drive unit,
   wherein the electronic control computer comprises a processor and a tangible memory device, the tangible memory device comprises a stored program, the program being readable and executable by the processor, the program comprises instructions for making connections in the vehicle driveline comprising the steps of:
   receiving, at the processor, a request to convert from a single drive axle-powered driveline to a two drive axle-powered driveline;
   receiving, at the processor, sensor data from the plurality of sensors;
   processing the received sensor data to determine vehicle dynamics and current engine power;
   determining an additional amount of engine power required to convert the vehicle from the single drive axle-powered driveline to the two drive axle-powered driveline;

sending, from the processor, a command to open at least one coupling in one of the all-wheel drive coupling or the auxiliary drive unit;

sending, from the processor, a command to increase engine power by the determined additional amount;

receiving, at the at least one coupling, the command to open the at least one coupling;

receiving, at the engine, the command to increase engine power;

receiving, at the processor, sensor data indicating that the engine power has increased by the determining additional amount; and sending, from the processor, in response to the received sensor data indicating that the engine power has increased by the determined additional amount, a command to engage at least the power transfer unit, wherein a first actuator of the plurality of actuators opens the at least one coupling and a second actuator of the plurality of actuators increases the engine power by the determined additional amount.

10. The vehicle driveline of claim 9, wherein the tangible memory device further comprises stored predetermined values and stored instructions to:

process the received sensor data to determine at least one of yaw, lateral acceleration, longitudinal acceleration, slip, or vehicle trajectory;

compare the processed sensor data to the stored predetermined values to determine vehicle readiness to convert the vehicle from the single drive axle-powered driveline to the two drive axle-powered driveline, wherein, when the comparison indicates vehicle readiness to convert from the single drive axle-powered driveline to the two drive axle-powered driveline, the processor outputs control commands to proceed with the conversion.

11. The vehicle driveline of claim 9, wherein the stored predetermined values comprise at least a calibration threshold, and the instructions further comprise:

determining a rotation speed of a powered single drive axle;

determining a rotation speed of a drive shaft;

calculating an absolute value of the difference between the rotational speed of the powered single drive axle and the rotational speed of the drive shaft; and determining that the absolute value is less than the calibration threshold, wherein, when the absolute value is less than the calibration threshold, the processor outputs commands to begin the conversion.

12. The vehicle driveline of claim 9, further comprising instructions to engage the all-wheel drive coupling and the auxiliary drive unit of the vehicle.

13. The vehicle driveline of claim 12, further comprising instructions to close the at least one coupling.

14. The vehicle driveline of claim 13, further comprising instructions to terminate the increased engine power.

15. The vehicle driveline of claim 9, wherein the additional amount of engine power is of sufficient magnitude to avoid transfer of vehicle kinetic energy to the auxiliary drive axle during conversion from the single axle-powered driveline to the two drive axle-powered driveline.

16. A vehicle driveline comprising a plurality of sensors and a plurality of actuators with respective connections to:

an electronic control computer, a primary drive axle connected to an engine and to a power transfer unit, and an auxiliary drive axle connected to the power transfer unit, the auxiliary drive axle comprising a drive shaft, an all-wheel drive coupling, an auxiliary drive unit, a first auxiliary drive axle on a first side of the auxiliary drive unit, and a second auxiliary drive axle on a second side of the auxiliary drive unit, wherein the electronic control computer comprises a processor and a tangible memory device, the tangible memory device comprises a stored program, the program being readable and executable by the processor, the program comprises instructions for making disconnections in the vehicle driveline comprising the steps of:

receiving, at the processor, a request to convert from a two drive axle-powered driveline to a single drive axle-powered driveline;

receiving, at the processor, sensor data from sensors distributed on the auxiliary drive axle and on the primary drive axle;

processing the received sensor data to determine vehicle dynamics and current engine power;

determining to suspend engine power output during a conversion of the vehicle from the two drive axle-powered driveline to the single drive axle-powered driveline;

sending, from the processor, a command to open at least one coupling in at least one of the power transfer unit, the all-wheel drive coupling, or the auxiliary drive unit;

sending, from the processor, a command to suspend engine power;

receiving, at the at least one coupling, the command to open the at least one coupling; and receiving, at the engine, the command to suspend engine power, wherein a first actuator of the plurality of actuators simultaneously opens the at least one coupling while a second actuator of the plurality of actuators suspends the engine power output during the conversion.

17. The vehicle driveline of claim 16, wherein the program comprises instructions for execution by the processor to:

determine whether to open each of the at least one coupling in the power transfer unit, the all-wheel drive coupling, and the auxiliary drive unit in a stepwise or simultaneous manner with respect to each of the at least one coupling based on the determined engine power; and send a command to open, simultaneously or stepwise, the at least one coupling in the power transfer unit, the all-wheel drive coupling, and the auxiliary drive unit.

18. The vehicle driveline of claim 9, further comprising a separate torque source in the auxiliary drive axle, the separate torque source configured to bring one of the drive shaft and the first auxiliary drive axle and the second auxiliary drive axle within a rotational range for coupling with the primary drive axle.

19. The vehicle driveline of claim 16, further comprising a separate torque source in the auxiliary drive axle, the separate torque source configured to bring one of the drive shaft and the first auxiliary drive axle and the second auxiliary drive axle within a rotational range for coupling with the primary drive axle.

* * * * *

UNITED STATES PATENT AND TRADEMARK OFFICE
CERTIFICATE OF CORRECTION

PATENT NO.         : 9,598,067 B2                                    Page 1 of 1
APPLICATION NO.    : 14/408285
DATED              : March 21, 2017
INVENTOR(S)        : Christian Thomas Chimner and John Allen Grogg It is certified that error appears in the above-identified patent and that said Letters Patent is hereby corrected as shown below:

In the Claims

At Column 11, Line 11 please delete "determining" and insert therein --determined--.

Signed and Sealed this
Twenty-fifth Day of April, 2017

Michelle K. Lee
*Director of the United States Patent and Trademark Office*